United States Patent Office 3,075,340
Patented Jan. 29, 1963

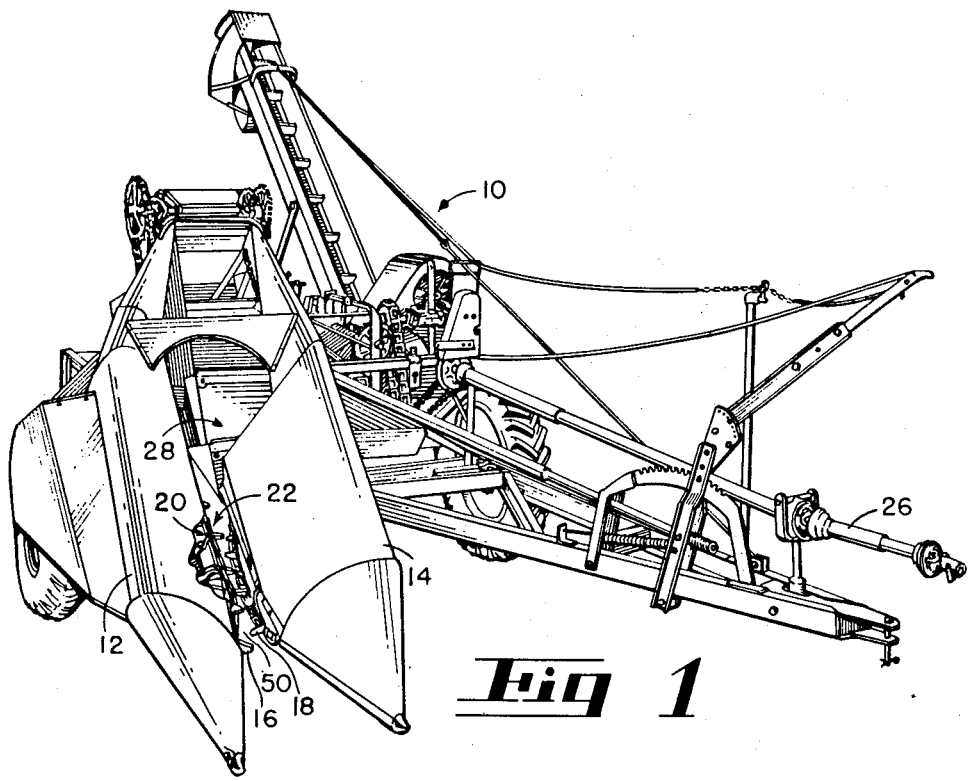

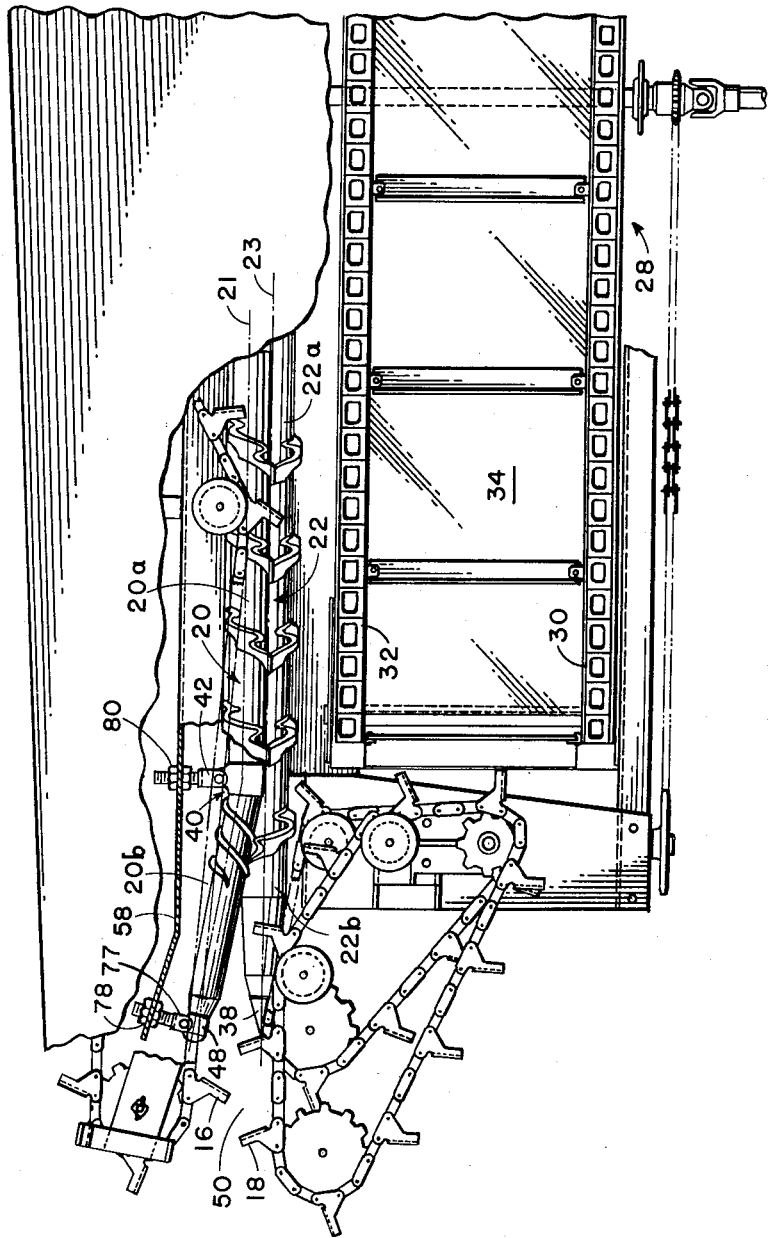

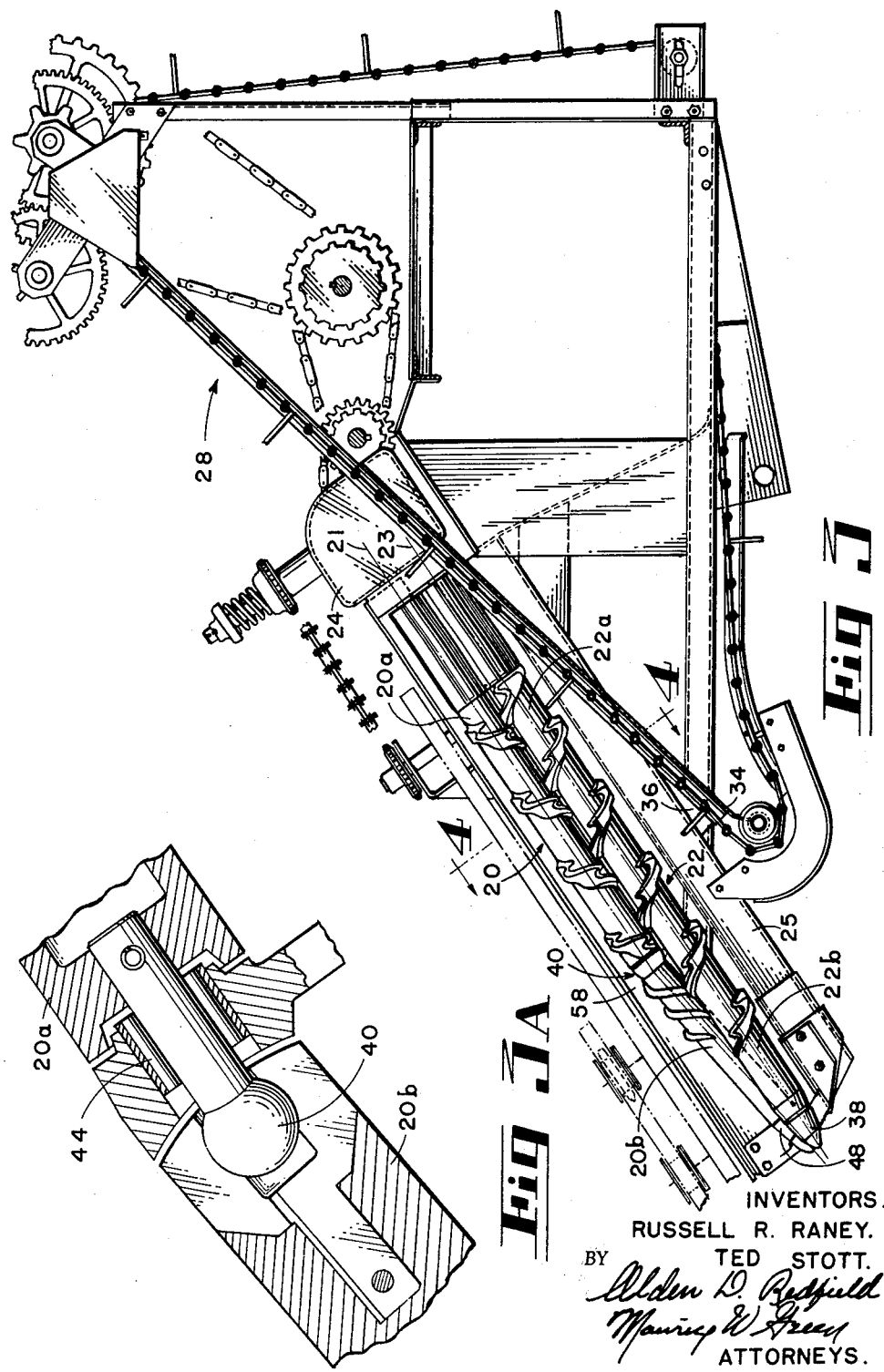

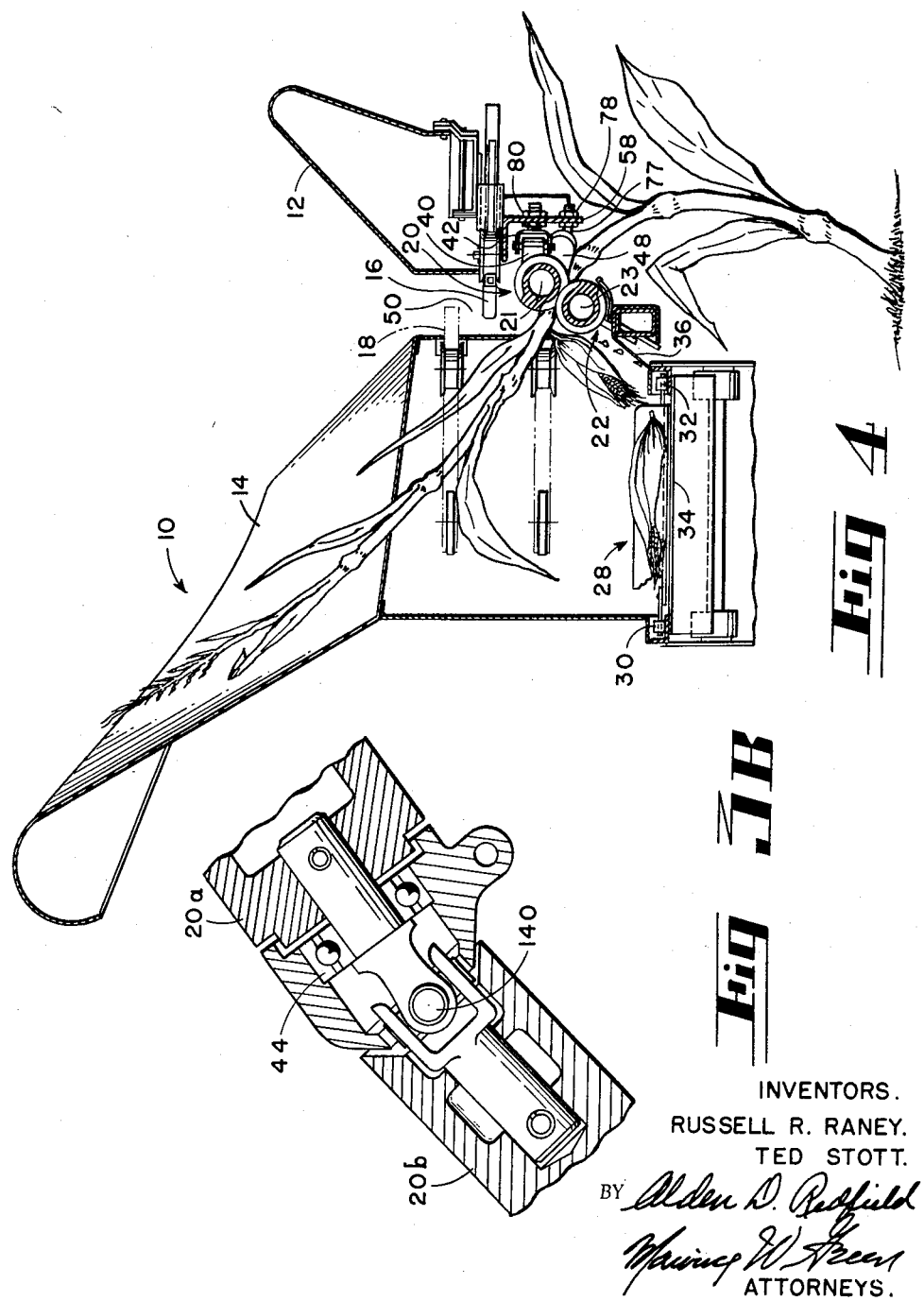

3,075,340
CORN HARVESTER
Russell R. Raney, Greenville, and Ted Stott, Celina, Ohio, assignors to Avco Corporation, Coldwater, Ohio, a corporation of Delaware
Filed Jan. 6, 1960, Ser. No. 734
6 Claims. (Cl. 56—104)

This invention relates to improvements in corn harvesting machines, sometimes called corn pickers, and more particularly relates to the gathering and snapping mechanism for severing the ears of corn from standing stalks and is a continuation-in-part of application, Serial No. 744,257 filed June 24, 1958, now abandoned.

In machines of this kind there is concern as to the manner of handling the ears after they are severed from the stalk and in the mechanisms most commonly used at the present time there is provided two adjacent rotating so-called snapping rolls between which the stalks pass and when the rotating rolls contact a portion of the stalk where an ear is located the stalk continues to pass between the rolls while the ear of corn, being of greater thickness, does not pass between the rolls and is severed from the stalk by the action of the rotating rolls. The two rolls are positioned with their axes of rotation parallel to each other and both inclined upwardly from a position near the ground to a position substantially higher than the height at which ears are to be encountered. Both of these rotating rolls are generally positioned at the same height above the ground in their inclined position and are located relative to an adjacent conveyor so that the ears of corn fall into the conveyor after severance from the stalk. Because of the location of the rolls there is a tendency for the severed ear of corn to roll or be carried a short distance along with the rotating rolls before it is pushed off onto the adjacent conveyor. During the severing process there is often shelling of corn from the ears, and even though slight, this amount of shelled corn may add up to a substantial loss if provision is not made to save it. The continuing rolling effect of the severed ear on the top of the rolls does add to the possibility of loss of shelled kernels.

In the lower region of the rotating rolls, where the rolls contact the stalk lower than the position of the ears to be severed therefrom, the function of the rolls is primarily one of gathering of the stalks and it has been the practice to provide a tapering of the rolls in this region to a smaller diameter at the bottom in the gathering region to provide for such gathering function. It is possible, however, that in some cases stalks of corn may become lodged or otherwise positioned such that ears are contacted in the gathering region and such premature contact of the rolls with the ear may result in shelling or even severing of the ear in a position lower than the point at which an adjacent conveyor is available to receive the ear thus severed.

The lower portion of the two rolls near the ground where the gathering of the stalks takes place has different problems as to adjustment and positioning as compared with the situation in the upper region of the rolls where the severing of the ear from the stalk takes place. In the lower or gathering region there is required a relatively larger space between the rolls and preferably the rolls should be divergent, that is, with the width between the rolls greater at the point of first entry of the stalk and continuing to a lesser spacing as the severing region is approached. While in the upper severing region relative positioning and adjustment are important, such adjustment is independent of that of the gathering region.

It is of major importance, nevertheless, to provide for adjustment of the distance between the rolls both in the gathering region and in the severing region. In prior art devices the requirement for this difference in adjustment in the two regions while using two adjacent rolls both extending on a single axis of rotation for each roll through both the gathering region and the severing region, made impossible an independent adjustment.

It is one of the objects of the present invention to provide a mechanism which will reduce the length of time that the ear is carried on the rolls after severance from the stalk and also to sever the ear in such manner and in such position that it will almost immediately fall into the adjacent conveyor, and further, that the rolls be so positioned relative to each other as to accomplish this purpose at the severing region, with provision for special arrangement of the projecting sides of the adjacent conveyor as to catch the shelled kernels, such arrangement being accomplished by a mechanism which will not interfere with the satisfactory entrance of the stalks of corn between the two rotating rolls at their lower ends adjacent the ground.

It is a further object to provide snapping rolls having two regions of relative position; (1) a gathering region near the ground by which the entrance of the stalk between the rolls is assured by a divergence of the rolls; (2) an ear severing region wherein the relative position of the rolls is such that the roll farthest from the adjacent conveyor is positioned higher than the roll adjacent the conveyor, thereby to cause the severed ear to fall promptly into the adjacent conveyor with a minimum of time on the rolls for shelling.

It is a further object to provide a jointed snapping roll allowing for the positioning of the rolls in the severing region so as to most advantageously result in a positive and prompt transfer of the severed ear into the adjacent conveyor with a minimum of shelling and a means to save such shelled corn as may result; and further to provide for a divergent positioning of the rolls in a lower gathering region by means of a type of joint in one of the rolls allowing such divergence; while providing in such gathering region a lower portion of the jointed roll rotated by frictional contact in the joint so that premature contact of ears by the rolls in the gathering region will result in the stopping of rotation of one of the rolls in that region and thereby reduce the possibility of premature snapping of the ear in the gathering region or the shelling of corn in that region.

It is another object of this invention to provide a snapping roll mechanism wherein the adjustment and relative positioning of the snapping rolls in the gathering region is provided so that the distance between the rolls and the adjustment thereof can be more satisfactorily accomplished in both the region of gathering and the severing while also providing for a relationship of the rolls in the severing region such that the shelling of corn from the ears in the severing region is minimized and the small amount of corn shelled from the severed ears is saved in the adjacent conveyor.

It is a further object to provide for divergent adjustable relationship in the lower gathering region without disturbing the adjusted relationship of the rolls in the severing region and likewise to afford independent adjustment in the severing region without materially disturbing the gathering region adjustment.

The above and other objects of the invention will appear more fully from the following detailed description and by reference to the accompanying drawings, forming a part hereof, and wherein:

FIGURE 1 is a perspective view with parts broken away of a corn harvester of the type employing the mechanism herein disclosed;

FIGURE 2 is an enlarged top view with parts broken away and parts in section showing the corn severing mechanism with adjacent conveyor;

FIGURE 3 is an enlarged side view with parts broken away showing the corn severing rolls, or so-called snapping rolls, and adjacent mechanism.

FIGURE 3a is an enlarged longitudinal section showing the structure of the joint connection between upper and lower portions of one of the snapping rolls;

FIGURE 3b is an enlarged longitudinal section of a modified form of a joint connection.

FIGURE 4 is a view partly in section, taken substantially on the line 4—4 of FIGURE 3.

Referring to the drawings:

A corn harvesting unit 10, shown generally in perspective view in FIGURE 1, employs corn gathering members 12, 14, designed to be carried by the machine along a row of standing corn, the corn passing between the extending sheet metal gathering members 12 and 14 as the harvester 10 is pulled over the ground along a row of standing corn. Gathering chains 16 and 18 pick up the corn as the harvester moves, and the corn moves between two rolls 20 and 22 (partially shown in FIGURE 1, but shown more clearly in FIGURES 2 and 3). Ears are snapped from the corn stalks when the stalk moves through the rolls and the ears do not so move but are severed from the stalk. The two rolls 20 and 22 (sometimes called ear snapping rolls) are driven from the gear box 24 from the drive mechanism of the machine (well known in the art, see FIG. 12, United States Patent 2,763,976), which is initially driven by a power takeoff shaft 26 (shown in FIGURE 1) which is connected to a tractor (not shown) which pulls the harvester 10. Also adjacent the two rolls there is a conveyor 28 comprising a pair of chains 30 and 32 which are shown in FIGURE 2 and likewise in FIGURE 4. It is also important that a sheet metal bottom 34 is provided beneath the conveyor, which sheet metal bottom 34 extends in a sheet metal portion 36 in a plane below the roll 22 so that there is a continuous tight bottom sheet metal region capable of holding shelled corn all the way from the under side of the roll 22 down to and underneath the conveyor 28 provided by the sheet metal portions 34 and 36. It is noted particularly in FIGURE 4, and also in FIGURES 2 and 3, that upper portions 20a, 22a of the two rolls 20 and 22, where they are positioned in parallelism (as shown in FIGURE 3) are so positioned that the upper portion 20a of the roll 20 is substantially above the upper portion 22a of the roll 22, making the plane passing through the axes 21, 23 of the rolls 20, 22 (FIG. 4) at substantially a 60 degree angle with the horizontal, in the machine illustrated, and inclined in a direction to slope toward the conveyor 28 (see FIGURE 4). It is also apparent that both upper and lower portions 22a, 22b of the roll 22, which is the lower roll, (as viewed in FIGURE 4) has a substantially straight rotating longitudinal axis 23 extending through both upper portion 22a and lower portion 22b from the driving mechanism or gear box 24 (see FIGURE 3) to the lower portion of the frame 25 and is supported by suitable bearings (not shown) in the gear box 24 at its upper end portion 22a and by bearing 38 at its lower end. However, the upper roll 20 has its upper bearing in the gear box 24 like the roll 22, but the upper portion 20a of the roll 20 which is parallel to the roll 22 terminates in a bearing 44 and a joint 40 in the central region about two-thirds of the distance down the roll 20 (as shown in FIGURE 3). The particular type of joint 40 here shown is a ball and socket joint 40 shown in more detail in FIGURE 3a, where it appears there is a suitable laterally adjustable support 42 for the ball and socket joint 40 (as shown in FIGURE 4). The joint 40 in the roll 20 allows the lower portion 20b of the roll 20 to be deflected downwardly at an angle to the upper portion 20a of the roll which lower portion 20b terminates in a bearing 48 spaced from the bearing 38. The support 42 is adjustable to various positions in a general direction near normal to the axes of the rolls, and such adjustment might take various forms, but is here shown as a threaded nut connection 80 to frame member 58 affording manual adjustment of the position of the joint 40 laterally relative to the adjacent roll 22. The deflected lower roll portion 20b relative to upper portion 20a made possible by joint 40 provides for a suitable entrant region to receive the stalks of corn as they move into the gathering region between the two rolls as the machine is carried over the field. The ball and socket joint 40 provides for deflection of the lower portion 20b of the roll 20, as above described, to provide for a divergent gathering region. Rotation of the upper portion 20a of this roll is positive from the driving mechanism 24 as is the entire adjacent roll 22. However, the lower portion 20b of this jointed roll 20, while it is free to rotate independently on its lower bearing 48 and the ball and socket joint 40, is rotated by the upper roll portion 20a through friction in the ball and socket joint 40 and the rotation of this lower portion 20b is therefore independent except for such friction drive. A support 77 for the lower bearing 48 is manually adjustable in lateral position by threaded nut connection 78 to frame member 58.

It is also noted on reference to FIGURES 2 and 3 that the lower angularly deflected portion 20b of the roll 20 is deflected downwardly toward a position approaching a side by side relationship with lower portion 22b of roll 22 and also lower portion 20b is inclined away from the roll 22 as well as downwardly, so that there is a substantial open gathering region 50 between the lower roll portions 20b, 22b to receive the stalks of corn as aforesaid. The portion of the mechanism, as above described, is illustrated by reference particularly to FIGURE 2 and 3 where it is apparent that stalks of corn entering between the gathering region 50 would be carried upwardly between lower roll portions 20b and 22b between the rolls 20 and 22 as the machine moves over the ground. The function of the lower roll portions 20b and 22b is to act to gather the stalks to feed them into the upper region for severing ears. However, on occasion, where ears may be encountered in this lower gathering region, it is desired that they will not be crushed between the rolls or the ear severed in this area but that the stalk be continued in its path toward the upper region. Inasmuch as the rotation drive connection to the lower roll portion 20b is by the friction afforded in the ball and socket joint 40, it is evident that when positive contact with an ear is made by the roll portion 20b it will stop its rotation momentarily and will act more as a deflector than as an ear snapper or crusher. Possibility of premature shelling or severing of the ear in the gathering region is thus materially reduced. As is apparent in FIGURE 4, as the stalk is moved between the rolls upwardly to upper roll portions 20a, 22a which are the ear severing portions of the rolls where the roll 20 is parallel to and above the roll 22, the stalk will be bent over so that ears of corn as they approach the position where they will be severed (sometimes called snapping) by the rolls are then positioned over the sheet metal bottom portions 34, 36, previously mentioned, and immediately when the ears are severed from the stalks they will fall by gravity downwardly into an adjacent conveyor together with any shelled corn which may be occasioned by the severing process. The amount of this shelled corn is minimized by the fact of the relative inclination of the two rolls sloping as shown in FIGURE 4 whereby there is no tendency for the severed ear to carry on and between the rolls for a short distance, as is common when the rolls are side by side in a horizontal position relative to each other.

The result of the coupling connection or joint 40 is to afford a divergent pair of rolls in the gathering region, one of which has frictional drive only which will not impose a positive snapping or shelling action in the gathering region, but will follow the desired function of gathering, thus avoiding any snapping or shelling tendency on the ears in the gathering region and deferring snapping until the ears reach the upper ear severing region of the snapping rolls.

It is important that with the upper portions 20a, 22a of the snapping rolls positioned with one roll above and to one side of the adjacent roll for the purpose of causing snapped ears to fall promptly into the adjacent conveyor, that the joint 40 in the upper roll 20 makes possible a satisfactory gathering region by allowing the lower portion 20b of the roll 20 to be positioned at an angle to the upper portion and thus provide a divergent open gathering region 50. The importance of this becomes apparent in the arrangement shown if it be considered that the rolls would continue parallel and above each other into the gathering region if it were not for the joint and the divergent position afforded by the joint. In such case it would be difficult to provide for gathering of the stalks as the effective space for gathering at the bottom would be insufficient. The jointed roll 20 therefore serves to provide a satisfactory gathering region while still maintaining the advantage of the positioning of one roll above the other in the upper ear severing region.

The relative location of the snapping rolls in the upper severing region with inclined relationship providing prompt movement of the severed ears into the adjacent conveyor plus the provision of the ball and socket joint 40 affording a divergent lower gathering region between the two rolls with the additional feature of independent rotation of the lower divergent portion 20b, driven from the upper portion 20a only by frictional contact in the joint 40, assures a division in the operation and effect of the rolls in the gathering region from the action of the rolls in the upper snapping region. That is, the rolls by the particular positioning and the jointed arrangement of one of the rolls results in structure adaptable for the different functions performed in the two regions. For instance, in operation as the machine travels over the corn field the divergent lower portions 20b, 22b of the rolls serve a primary gathering function to guide the stalks into the upper ear snapping region. The fact that ear snapping and particularly corn shelling is to be avoided in the lower portion is more definitely assured by the divergent independently rotatable, non-positively driven lower portion 20b, (driven only by friction in joint 40, FIG. 3a) while the particular relationship of the upper positively driven roll portions 20a, 22a with the portion 20a above and slightly to one side of the adjacent rotating snapping portion 22a, affords the prompt discharge of the severed ears into the adjacent conveyor along with a saving of any of the shelled corn which may result.

The adjustment of the two snapping rolls 20, 22 laterally relative to each other in both the gathering and severing regions is a very important consideration and the arrangement above described for accomplishing this adjustment for varying conditions of field operation provides a major advantage by allowing adjustment in the lower gathering region without materially disturbing a satisfactory adjustment in the upper ear severing region, or vice versa. Such a result has been difficult of accomplishment in prior art devices in that with the axis of both rolls unjointed throughout their lengths, the adjustment in one region was necessarily compromised by the requirements for adjustment in the other region. However, with the provision of one jointed roll as aforesaid, the joint 40 can be mounted with adjustable support 42, 80 to the frame 58 as shown, and such adjustment will provide for variation of the relative adjacent positioning of the rolls in the severing region 20a, 22a while the lower adjustment 78 at the end of the diverging rolls in the gathering region provides for relative adjustment in the relative position of the gathering section 20b, 22b of the rolls without disturbing the satisfactory adjustment for severing of the ears. This important adjustment in both regions is made possible by the jointed roll arrangement with adjustment connections at both the end of the jointed roll and at the joint in the roll. Thus, the adjustments provided are made possible by one jointed roll but result in independent relative lateral positioning of the rolls in adjustment of the regions of ear severing and stalk gathering.

A modified form of the invention is shown in FIGURE 3b which shows a universal joint 140 between the upper portion 20a and the lower portion 20b of the jointed roll 20. In this modified form the universal joint 140 provides a positive connection between the upper portion 20a and the lower portion 20b of the jointed roll 20 so that there is a positive rotation of the lower portion 20b while affording a divergence in the positioning of the rolls in the gathering region.

Although the invention has been disclosed by references to a specific structure found practical in operation, it is intended that variations and modifications may be made within the scope of the following claims.

We claim:

1. In a corn harvesting mechanism, stalk gathering and corn ear snapping means comprising a first and second roll, said rolls being adjacent and rotatable, an ear conveyor, said rolls extending from a position adjacent the ground to a position adjacent said conveyor, said first roll being disposed furthest from said conveyor and being positioned above and to one side of said second roll whereby snapped ears are ejected onto said conveyor, each of said rolls having a gathering section and a snapping section, the respective snapping sections being disposed in substantially parallel relationship, the gathering and snapping sections of said second roll being unitary, said first roll having a gathering section provided at its upper end with a flexible joint affording interconnection with the snapping section thereof, said joint being about two-thirds of the distance down said first roll, said gathering section of said first roll being extended outwardly and downwardly from said joint to divergent stalk gathering position with respect to said second roll, whereby stalk gathering is achieved despite the said relative position of the said snapping sections of said rolls.

2. The mechanism as defined in claim 1 wherein said flexible joint comprises a ball and socket connection enabling friction drive but independent and non-positive rotation between said gathering and snapping sections of said first roll, whereby premature snapping of the ears between said respective gathering sections is prevented.

3. The mechanism as defined in claim 1 wherein said flexible joint comprises a universal connection affording positive drive between said gathering and snapping sections of said first roll despite said divergent stalk gathering position of said first roll.

4. In a corn harvesting mechanism, stalk gathering and corn ear snapping means comprising a first and a second roll, said rolls being adjacent and rotatable, an ear conveyor, said rolls extending from a position adjacent the ground to a position adjacent said conveyor, said first roll being disposed furthest from said conveyor and positioned above and to one side of the second of said rolls, a plane passing through the axes of said rolls being disposed about 60° to the horizontal, whereby snapped ears are ejected onto said conveyor, each of said rolls having a gathering section and a snapping section, the respective snapping sections being disposed in substantially parallel relationship, the gathering and snapping sections of said second roll being unitary, said first roll having a gathering section provided at its upper end with a flexible joint affording interconnection with the snapping section thereof, said joint being about two-thirds the distance down said first roll, said gathering section of said first roll being extended outwardly and downwardly from said joint to divergent stalk gathering position with respect to said other roll, whereby stalk gathering is achieved despite the angularity of said plane.

5. The mechanism as defined in claim 4 wherein said flexible joint comprises a ball and socket connection enabling friction drive but independent and non-positive rotation between said gathering and snapping sections of said first roll, whereby premature snapping of the ears between said gathering sections is prevented.

6. The mechanism as defined in claim 4 wherein said flexible joint comprises a universal connection affording positive drive between said gathering and snapping sections of said first roll despite said divergent stalk gathering position of said one roll.

References Cited in the file of this patent

UNITED STATES PATENTS

| | | |
|---|---|---|
| 2,334,945 | Mitchell et al. | Nov. 23, 1943 |
| 2,677,227 | Caldwell | May 4, 1954 |
| 2,681,541 | Richey et al. | June 22, 1954 |
| 2,777,273 | Heth | Jan. 15, 1957 |
| 2,927,414 | Jones | Mar. 8, 1960 |
| 2,947,133 | Hyman et al. | Aug. 2, 1960 |